United States Patent
Viswanadha

(10) Patent No.: US 11,256,686 B2
(45) Date of Patent: Feb. 22, 2022

(54) SCALABLE IMPLEMENTATIONS OF MULTI-DIMENSIONAL AGGREGATIONS WITH INPUT BLENDING IN DISTRIBUTED QUERY PROCESSING SYSTEMS

(71) Applicant: Microsoft Technology Licensing, LLC, Redmond, WA (US)

(72) Inventor: Sreenivasa Viswanadha, Cupertino, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 543 days.

(21) Appl. No.: 16/206,934

(22) Filed: Nov. 30, 2018

(65) Prior Publication Data
US 2020/0175005 A1    Jun. 4, 2020

(51) Int. Cl.
*G06F 16/242*      (2019.01)
*G06F 16/2458*      (2019.01)
(Continued)

(52) U.S. Cl.
CPC ........ *G06F 16/244* (2019.01); *G06F 16/2282* (2019.01); *G06F 16/2471* (2019.01); *G06F 16/278* (2019.01); *G06F 16/283* (2019.01)

(58) Field of Classification Search
CPC .............. G06F 16/244; G06F 16/2471; G06F 16/2282; G06F 16/278; G06F 16/283
See application file for complete search history.

(56) References Cited

U.S. PATENT DOCUMENTS

2010/0030800 A1*   2/2010   Brodfuehrer ....... G06F 16/2282
                                                                    707/803
2013/0275365 A1*   10/2013   Wang .................... G06F 16/283
                                                                    707/602
(Continued)

OTHER PUBLICATIONS

Agarwal, et al., "On the Computation of Multidimensional Aggregates", In Proceedings of the 22nd VLDB Conference, Sep. 3, 1996, 16 Pages.
(Continued)

*Primary Examiner* — Matthew J Ellis
(74) *Attorney, Agent, or Firm* — Fiala & Weaver P.L.L.C.

(57) ABSTRACT

Systems and devices implement scalable implementations of multi-dimensional aggregations with input blending in distributed query processing systems. Multi-dimensional aggregations for identifiers/values designated fields in datasets are performed based on keys. Datasets are sorted by identifier/value and divided into first partitions. Each row of data with a specific sorted-by-identifier/value is only present in one of the first partitions. Keys are generated from each combination of two or more dataset fields, and a blended table of data is generated over the partitions based on each different key combination. Designated data field characteristics are determined for the blended table based on the different key combinations. The characteristics are divided into second partitions based on the keys, where each key is present in only one of the second partitions. A final designated data field characteristic is determined for each row of data in each of the second partitions as the multi-dimensional aggregation.

20 Claims, 5 Drawing Sheets

(51) Int. Cl.
G06F 16/22 (2019.01)
G06F 16/27 (2019.01)
G06F 16/28 (2019.01)

(56) References Cited

U.S. PATENT DOCUMENTS

| | | | | |
|---|---|---|---|---|
| 2015/0212760 A1* | 7/2015 | Goel | ............... | G06F 3/0605 714/6.3 |
| 2016/0042039 A1* | 2/2016 | Kaufmann | .......... | G06F 16/2456 707/722 |
| 2016/0173406 A1* | 6/2016 | Geller | ............... | G06F 9/468 709/225 |
| 2016/0335318 A1* | 11/2016 | Gerweck | ............. | G06F 16/2264 |
| 2017/0193058 A1* | 7/2017 | Fung | ............... | G06F 16/248 |

OTHER PUBLICATIONS

"International Search Report and Written Opinion Issued in PCT Application No. PCT/US19/062711", dated Feb. 19, 2020, 10 Pages.

* cited by examiner

SCALABLE IMPLEMENTATIONS OF MULTI-DIMENSIONAL AGGREGATIONS WITH INPUT BLENDING IN DISTRIBUTED QUERY PROCESSING SYSTEMS

BACKGROUND

In databases, multi-dimensional aggregations performed on keys return values for a field of data over some or all values for combinations of the keys. For very large input datasets, like big data, operations such as grouping sets, group by rollups, and group by cubes produce multi-dimensional aggregates, grouping by subsets of group-by keys, with cubes being the largest operator which includes all subsets of the key combinations. Current solutions aggregate for each combination of the keys use, as separate aggregation, and perform a union over each of the separate aggregations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and devices implement scalable implementations of multi-dimensional aggregations with input blending in distributed query processing systems. Multi-dimensional aggregations for identifiers/values designated fields in datasets are performed based on keys. Datasets are sorted by identifier/value and divided into first partitions. Each row of data with a specific sorted-by-identifier/value is only present in one of the first partitions. Keys are generated from each combination of two or more dataset fields, and a blended table of data is generated over the partitions based on each different key combination. Designated data field characteristics are determined for the blended table based on the different key combinations. The characteristics are divided into second partitions based on the keys, where each key is present in only one of the second partitions. A final designated data field characteristic is determined for each row of data in each of the second partitions as the multi-dimensional aggregation.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
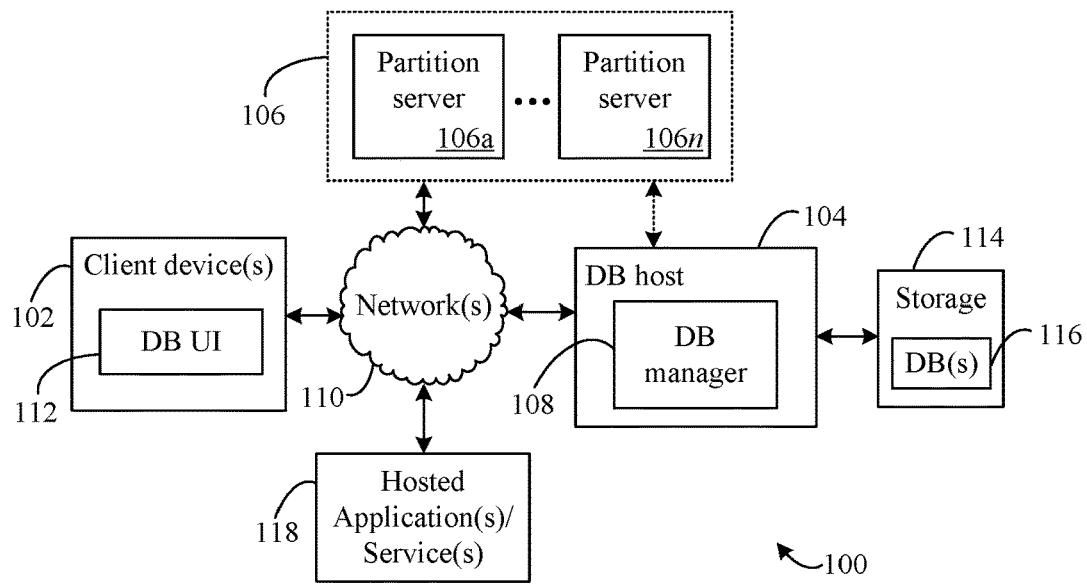
FIG. 1 shows a block diagram of a networked system for scalable implementations of multi-dimensional aggregations in distributed query processing systems, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for scalable implementations of multi-dimensional aggregations with input blending in distributed query processing systems. Section III below describes example computing device embodiments that may be used to implement features of the embodiments described herein. Section IV below describes additional examples and advantages, and Section V provides some concluding remarks.

II. Example Embodiments for Multi-Dimensional Aggregations with Input Blending Scalable implementations of multi-dimensional aggregations with input blending in distributed query processing systems are implemented via systems and devices. Multi-dimensional aggregations for identifiers/values of a designated field in dataset are performed based on keys. Datasets are sorted by identifiers/values of a field and divided into first partitions. Each row of data having the same value for the field used to sort the dataset is only present in one of the first partitions—that is, all rows of data having the same value for the sorting field are all together in the same partition. Keys may be combinations of fields in a dataset, including empty or null designations for the fields, over which the multi-dimensional aggregations of values for another field are performed. Keys are generated from each combination of two or more dataset fields where one of the fields is used to sort the dataset. A blended table of data from the dataset is divided over the partitions based on each different key combination. For each of the partitions over which the blended table is divided, characteristics such as values, aggregations or sums or totals, partial aggregations or sums or totals, and/or the like, are determined for the designated data field based on the different combinations of keys. The characteristics are divided into second partitions based on the keys, where each key combination is present only in a one of the second partitions. A final characteristic of the data field is then determined for each row of data in each of the second partitions as the multi-dimensional aggregation.

As used herein, an identifier in a field may be synonymous with a value in a field. For example, a field in a dataset may include the names of users. Thus, this field may include identifiers of users, while at the same time, each of the identifiers may have a value where identifiers/values may have multiple instances in the field. Accordingly, for embodiments described herein, examples that refer to values in fields for description and illustration are also contemplated as being equivalently applicable to identifiers in the fields.

It is also contemplated herein that while some embodiments may be described in association with certain database server implementations, the embodiments described are applicable to, and may be adapted to, any type of database server regardless of syntax or implementation-specific details thereof.

For multi-dimensional aggregations, scalability is problematic. In particular, the zero- or root-level aggregation affects scalability as it cannot be distributed resulting in bottlenecks, which tax processing resource usage as well as times to completion, or outright blocking which prevents results from being obtained. Additionally, the support required by database servers for multi-dimensional aggregations with complex key combinations as well as additional sub-operations require additional system resources and time to perform. This problem is further exacerbated as the size of datasets increases up to and including big data stores, or stores of data that are too large for traditional solutions to be applied for data analysis, especially in a distributed manner.

The embodiments herein provide novel solutions to these problems that not only determine multi-dimensional aggregations via input blending over multiple keys, but also perform such aggregations in ways that increase system efficiency, reduce memory footprints and processing requirements, prevent root-level bottlenecks/blocking, and also provide for balancing of memory allocation. For instance, datasets may be sorted according to a data field and partitioned and modified, or exploded, to include, for each row of data in the original partitions, rows of that data corresponding to each key combination through input blending over the partitions. In the partitions, the exploded table of data from the dataset may be partially aggregated and grouped to determine partial characteristics, then new partitions are generated based on the key combinations. Another partial aggregation is performed on the new partitions to determine final characteristics desired for the multi-dimensional aggregation. The initial and final characteristics for the partitions determine, or represent, the final result.

In other words, the embodiments herein provide for partitioning the dataset and expanding the data in each partition of the blended table to allow for a single aggregation to be performed over the exploded data. These and further embodiments are described in greater detail as follows.

Systems and devices may be configured in various ways for scalable implementations of multi-dimensional aggregations with input blending in distributed query processing systems. For instance, FIG. 1 is a block diagram of a computing system 100 ("system 100" hereinafter), according to embodiments. System 100 is configured to enable scalable implementations of multi-dimensional aggregations with input blending in distributed query processing systems, according to embodiments. As shown in FIG. 1, system 100 includes a client device 102, a database (DB) host 104, and a distributed server group 106, which may communicate with each other over a network 110. System 100 also includes a hosted application(s)/service(s) 118 that may be associated with a DB/dataset. It should be noted that any numbers of client devices, DB hosts, and/or distributed server groups may be present in various embodiments. Additionally, any combination of the components illustrated in FIG. 1 may be present in system 100, according to embodiments.

As noted above, client device 102, DB host 104, and distributed server group 106 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

DB host 104 may comprise one or more server computers or computing devices, which may include one or more distributed or "cloud-based" servers. In embodiments, DB host 104 may be associated with, or may be a part of, a cloud-based service platform such as Microsoft® Azure® from Microsoft Corporation of Redmond, Wash. DB host 104 may be configured to include multiple logical processing partitions for performing scalable implementations of multi-dimensional aggregations with input blending in distributed query processing systems.

DB host 104 may include a storage 114, that may be internal or external (as shown) to DB host 104, and that stores one or more databases (DB(s)) 116 against which queries may be performed according to the described embodiments herein, including by not limited to queries based on multi-dimensional aggregations for identifiers/values in datasets stored in DB(s) 116. Storage 114 may be any type of storage device or array of devices, and while shown as being communicatively coupled to DB host 104 outside of network 110, storage 114 may be networked storage that is accessible via network 110.

Hosted application(s)/service(s) 118 may be one or more of any type of application and/or service for which DB(s) 116 is associated. For example, hosted application(s)/service(s) 118 may be one or more applications and/or services hosted via Microsoft® Azure®. DB(s) 116 for hosted application(s)/service(s) 118 may include datasets storing data associated therewith, including but not limited to, user account information, a log entry dataset storing data for all accesses of different users, sales information, and/or the like. In embodiments, hosted application(s)/service(s) 118 may also include applications and/or services that are stand-alone rather than hosted.

Client device 102 may be any type of computing device or computing system, including a terminal, a personal computer, a laptop computer, a tablet device, a smart phone, a personal digital assistant, and/or the like that may be utilized to query a database. In embodiments, client device 102 may be used by an administrator, support staff, customers, and/or clients associated with datasets stored in DB(s) 116. Queries to DB(s) 116 may be performed via DB host 104 and/or via a DB user interface (UI) 112 of client device 102. DB UI 112 may include one or more components to enable a user thereof to provide queries/requests, e.g., queries for multi-dimensional aggregations, according to embodiments. An instance of DB UI 112 may be present in DB host 104 in some embodiments.

Client devices and DB hosts described herein may be configured to execute software applications/services for querying databases and for scalable implementations of multi-dimensional aggregations with input blending in distributed query processing. For example, a DB manager 108 may be a software application/service so configured. As illustrated, DB host 104 may include an instance of DB manager 108. DB manager 108 may be a part of an operating system (OS), a database server package, and/or an application installed at a computing system, may be an application/service itself, etc., in various embodiments. DB manager 108 is configured to perform scalable operations for determining multi-dimensional aggregations, as described in further detail herein.

For example, when a query is provided to DB host 104 from client device 102 for execution against a DB(s) 116, DB manager 108 may be configured to receive the incoming query and determine multi-dimensional aggregations for values of a field in a dataset in DB(s) 116. The determination of multi-dimensional aggregations may be performed against one or more datasets stored in DB(s) 116, and may be based on keys in the datasets that are specified by the queries.

For instance, a sales dataset may include data for sales of product/service units for a company, or different companies, by purchasers. Sales may be indicated by date, city, state, country, or other region, may specify types or models of products/services, may specify method of purchase (e.g., online, in-person, and/or the like.), etc. Similarly, a dataset may be an event log dataset, generally, that stores information related to any type of event, not only sales. Events may be accesses to services/applications, such as those hosted by cloud-based infrastructure, may be calls to a call center, may be numbers of voters voting in an election, etc. A query may specify that a multi-dimensional aggregation of a value be performed on the dataset. A multi-dimensional aggregation, e.g., of unit sales for a product/service, may be determined efficiently via DB manager 108 over two or more different keys (e.g., date and city, or date and country), even for big data storage with billions or hundreds of billions of raw data entries in the dataset.

DB manager 108 may be implemented in hardware, hardware combined with one or both of software and/or firmware, and/or as program instructions encoded on computer-readable storage media, and may be configured to perform any functions and/or operations described herein associated with scalable implementations of multi-dimensional aggregations with input blending in distributed query processing systems. In embodiments, an instance of DB manager 108 may be implemented in distributed server group 106. In such an example, distributed server group 106 may receive queries from DB host 104 and/or client device 102 according to embodiments herein. Additionally, one or more portions of DB manager 108 may be distributed or duplicated between DB host 104 and distributed server group 106 in various scalable implementation examples.

Distributed server group 106 may comprise one or more server computers, e.g., partition servers 106a-106n, or other computing devices noted herein, which may include one or more distributed or "cloud-based" servers, and which may be logically independent. In embodiments, distributed server group 106 may be associated with, or may be a part of, a cloud-based service platform such as Microsoft® Azure® from Microsoft Corporation of Redmond, Wash. Distributed server group 106 and partition servers 106a-106n may receive and store partitions of datasets from DB(s) 116 on which operations for scalable implementations of multi-dimensional aggregations with input blending in distributed query processing systems may be performed, as described herein. Partition servers 106a-106n are logically separate from each other, according to embodiments.

It should be noted that as described herein, embodiments of DB host 104 and/or distributed server group 106 are applicable to any type of system architecture in which datasets, including very large datasets like big data, are queried for multi-dimensional aggregations. One example noted above is where distributed server group 106 is a "cloud" implementation or service in a network architecture/platform. A cloud platform may include a networked set of computing resources, including servers, routers, etc., that are configurable, shareable, provide data security, and are accessible over a network, such as the Internet. Cloud implementations/services for embodiments may run on these computing resources, often atop operating systems that run on the resources, for entities that access the implementations/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Figure 2:
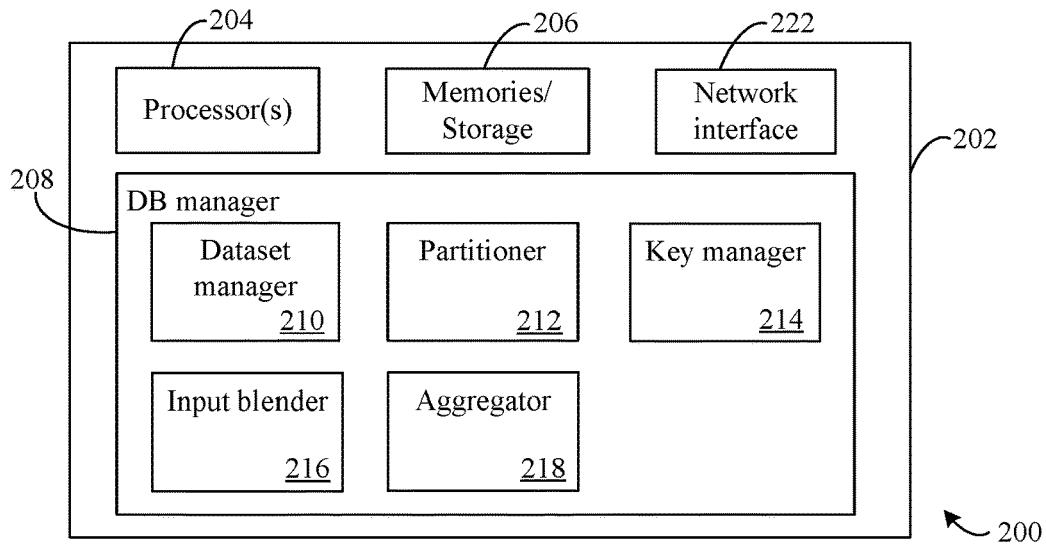
FIG. 2 shows a block diagram of a system for scalable implementations of multi-dimensional aggregations in distributed query processing systems, according to an example embodiment.

Accordingly, a processing system such as DB host 104 may be configured in various ways for improvements and enhancements in scalable implementations of multi-dimensional aggregations with input blending in distributed query processing systems. For example, FIG. 2 is a block diagram of a system 200 configured for such improvements and enhancements. System 200 may be an embodiment of system 100 of FIG. 1, e.g., DB host 104 and/or distributed server group 106. System 200 is described as follows.

System 200 includes a computing device 202, which may be an embodiment of DB host 104 of FIG. 1, and may be any type of server or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a DB manager 208 that may be an embodiment of DB manager 108 of FIG. 1. System 200 may also include additional components (not shown for brevity and illustrative clarity) including, but not limited to, components and subcomponents of other devices and/or systems herein, as well as those described below with respect to FIG. 7, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be a multi-core processor configured to execute more than one processing thread concurrently. Processor 204 comprises circuitry that is configured to execute computer program instructions such as but not limited to embodiments of DB manager 208, which may be implemented as computer program instructions for scalable implementations of multi-dimensional aggregations with input blending in distributed query processing systems, etc., as described herein. Memory 206 may include storage 114 of FIG. 1, and may be configured to store such computer program instructions/code, as well as to store other information and data described in this disclosure including, without limitation, DBs of DB(s) 116 of FIG. 1, e.g., big data stores, etc.

Network interface 226 may be any type or number of wired and/or wireless network adapter, modem, etc., configured to enable system 200 to communicate with other devices over a network, such as communications between system 200 and other devices utilized in a network as described herein (e.g., client device 102, DB host 104, and/or distributed server group 106) over a network such as network 110 as described above with respect to FIG. 1.

DB manager 208 includes a plurality of components for performing the functions and operations described herein for scalable implementations of multi-dimensional aggregations with input blending in distributed query processing systems. For instance, DB manager 208 may receive and parse queries or information related thereto for a dataset, and in response, determine a multi-dimensional aggregations of values of fields in the dataset based on keys. As shown, DB manager 208 includes a dataset manager 210, a partitioner 212, a key manager 214, an input blender 216, and an aggregator 218. While shown separately for illustrative clarity, in embodiments, one or more of dataset manager 210, partitioner 212, key manager 214, input blender 216, and/or aggregator 218, may be combined together and/or as a part of other components of system 200. In some embodiments, less than all of the components of DB manager 208 illustrated in FIG. 2 may be included. In software implementations, one or more components of DB manager 208 may be stored in memory 206 and are executed by processor 204.

Dataset manager 210 may be configured to access datasets to which queries are directed for multi-dimensional aggregations. Dataset manager 210 may also be configured to provide datasets, or portions thereof, to logical partitions of processing devices such as computing device 202 and/or to distributed server group 106 of FIG. 1, according to embodiments. Partitioner 212 may be configured to shuffle, or partition, datasets amongst the logical partitions and/or partitions servers 106a-106n of distributed server group 106, as described in further detail below. Partitioner 212 may be configured to balance partitions of datasets to avoid, or reduce, skewing.

Key manager 214 may be configured to generate, or specify, and associate keys, including compound keys or sets of keys, with identifiers/values of fields in datasets. Key manager 214 may be configured to generate or specify keys based on features of received queries. Input blender 216 may be configured to blend data of input datasets associated with queries. That is, when a query specifies a dataset on which to operate, that dataset is the input for the operations designated in the query, such as multi-dimensional aggregation operations. Blending data may include generating additional rows of existing data with different key combinations, combining fields of data, generating new temporary fields of data, and/or the like. Aggregator 218 may be configured to aggregate information and perform multi-dimensional aggregations, as described for embodiments herein.

Accordingly, DB manager 208 may operate in various ways to enable improvements in scalable implementations of multi-dimensional aggregations with input blending in distributed query processing systems. Additional details regarding DB manager 208 and its components are provided below.

Figure 3:
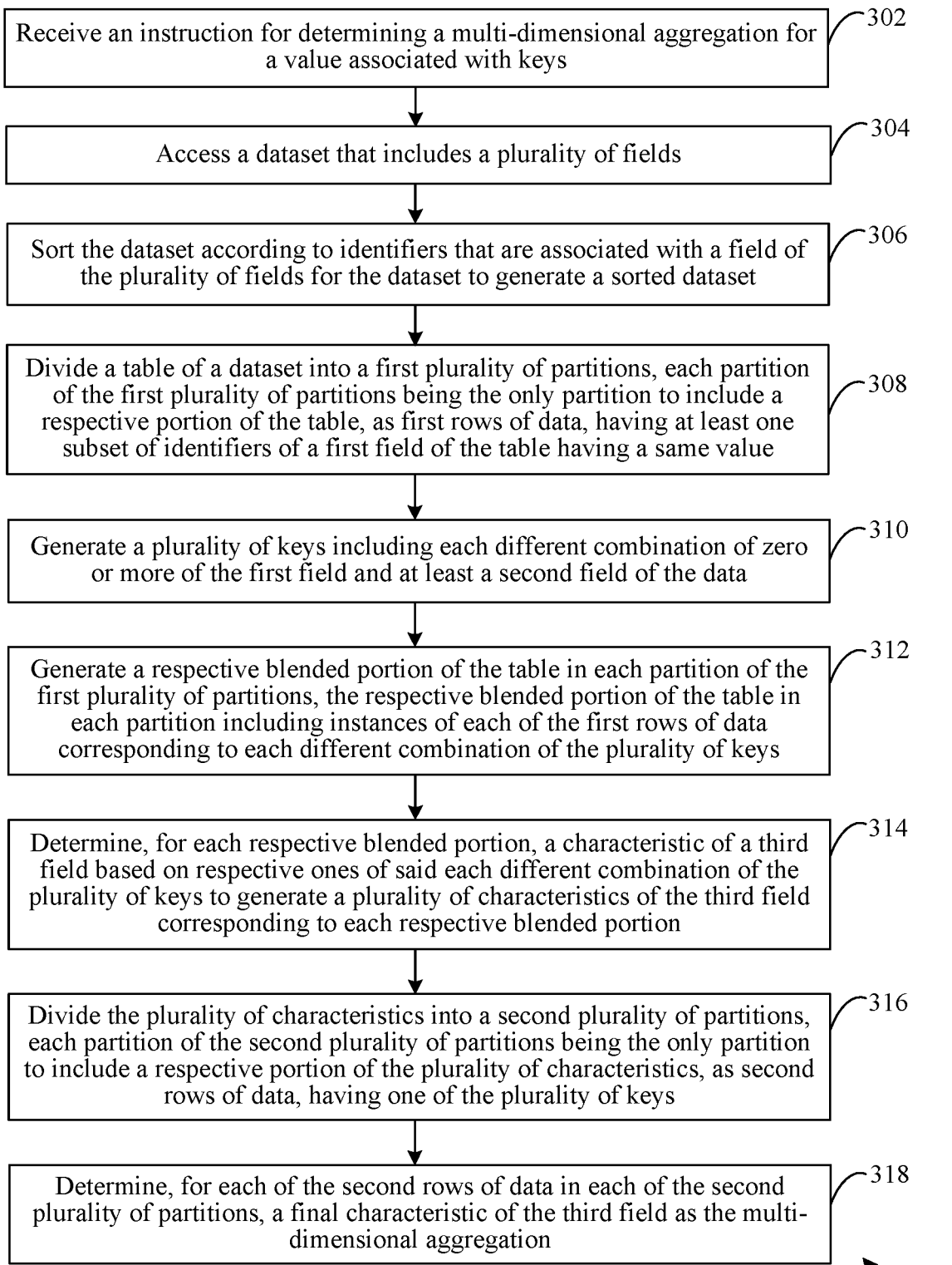
FIG. 3 shows a flowchart for scalable implementations of multi-dimensional aggregations in distributed query processing systems, according to an example embodiment.
Figure 4:
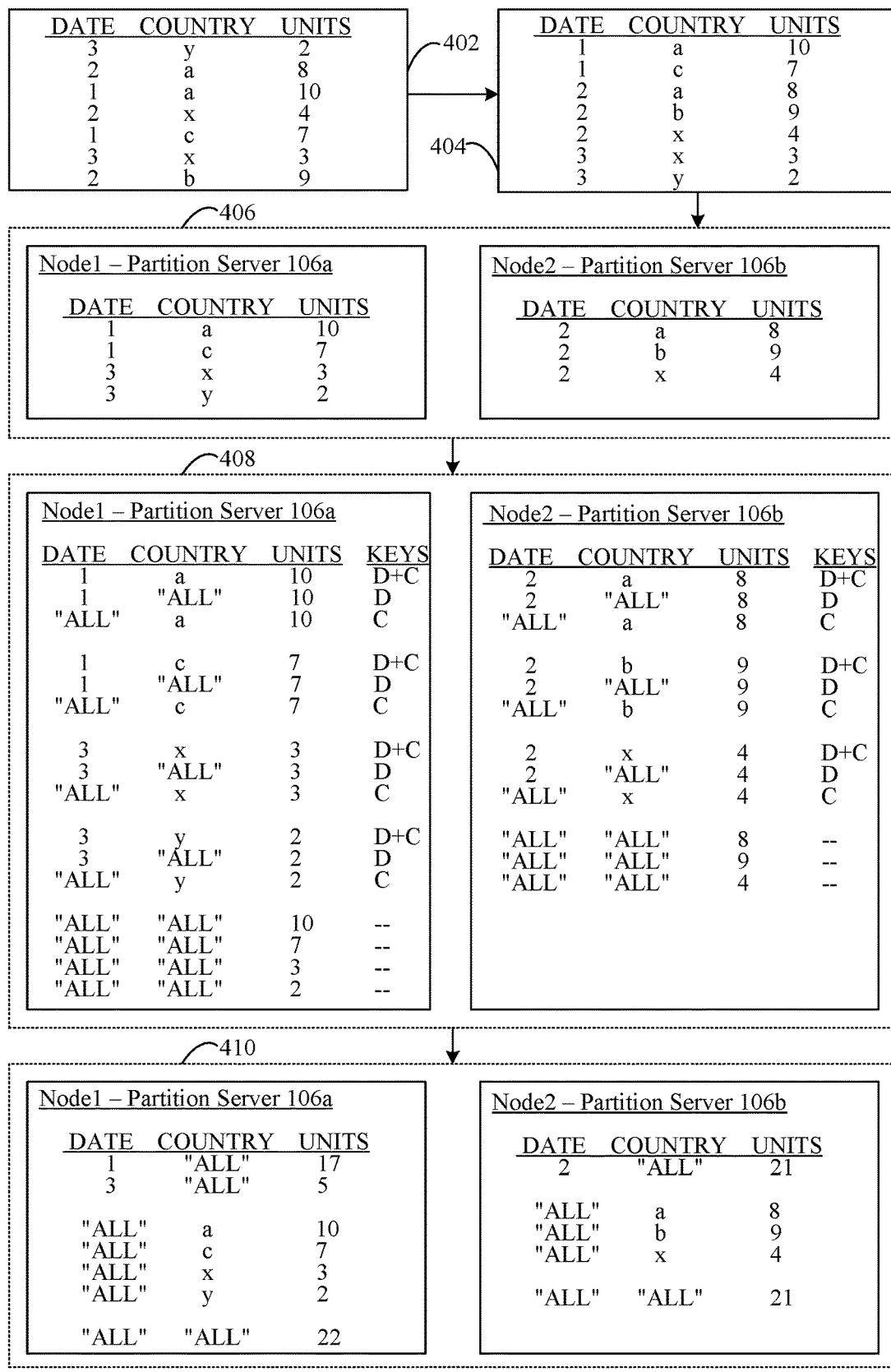
FIG. 4 shows a flow diagram for scalable implementations of multi-dimensional aggregations in distributed query processing systems, according to an example embodiment.
Figure 5:
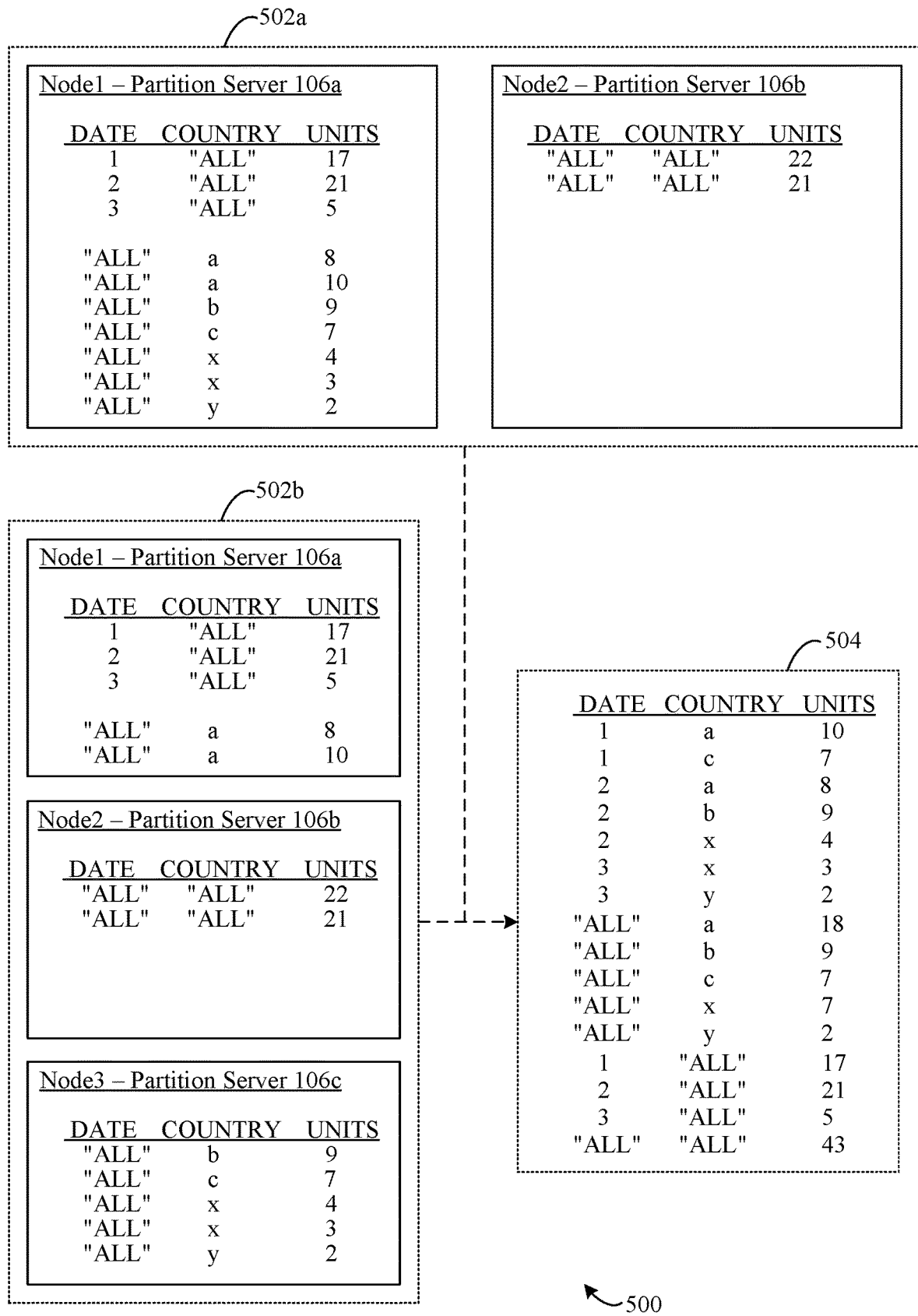
FIG. 5 shows a flow diagram, that is a continuation of the flow diagram in FIG. 4, for scalable implementations of multi-dimensional aggregations in distributed query processing systems, according to an example embodiment.

For instance, systems and devices may be configured in various ways according to the embodiments herein. FIG. 3, FIG. 4, and FIG. 5 will now be described. FIG. 3 shows a flowchart 300, FIG. 4 shows a flow diagram 400, and FIG. 5 shows a flow diagram 500, for scalable implementations of multi-dimensional aggregations with input blending in distributed query processing systems, according to example embodiments. DB manager 208 may operate according to flowchart 300, flow diagram 400, and flow diagram 500, in embodiments. Further structural and operational examples will be apparent to persons skilled in the relevant art(s) based on the following description.

Flowchart 300, flow diagram 400, and flow diagram 500 are described as follows with respect to system 100 of FIG. 1 and system 200 of FIG. 2.

Flowchart 300 begins at step 302. In step 302, an instruction for determining multi-dimensional aggregation for a value associated with keys is received. For example, computing device 202 and/or DB manager 208 of system 200 in FIG. 2 may be configured to receive incoming queries to be run against datasets in DB(s) 116 of FIG. 1. Incoming queries may specify a multi-dimensional aggregation for a specific identifier/value over keys for a dataset, and may be received over network 110 from client device 102 of FIG. 1. In embodiments, queries may be generated at DB host 104, computing device 202, or any other type of computing device described herein.

With respect to the example embodiments in flowchart 300, flow diagram 400, and flow diagram 500, the query received may be for a multi-dimensional aggregation of units sold that includes the date and country of sale as the keys.

In step 304 of flowchart 300, a dataset that includes a plurality of fields is accessed. For instance, dataset manager 210 may be configured to access the dataset specified in the query received in step 302. Dataset manager 210 may access the dataset in storage 114, either directly or via network 110, in embodiments. Once accessed, the dataset may be processed, retrieved, and/or distributed by dataset manager 210 and/or DB manager 208.

Referring also to flow diagram 400, in step 402, an example sales dataset is accessed by dataset manager 210. Datasets may include data fields for groups of data maintained in the dataset, and also identifiers/values for the data in the fields. As exemplarily shown, the illustrated dataset for sales of "units" includes fields Date, Country, and Units, respectively. Each row, or entry, in the dataset includes an identifier for the Date of the sale(s) (e.g., 1, 2, 3 . . . ), the Country of the sale(s) (e.g., a, b, c, x, y . . . ), and a number of units sold.

In step 306 of flowchart 300, the dataset is sorted according to identifiers that are associated with a field of the plurality of fields for the dataset to generate a sorted dataset. For example, partitioner 212 may be configured to sort datasets. Partitioner 212 may sort datasets based on identifiers/values associated with fields in the datasets. In embodiments, partitioner 212 may sort a dataset based on specified fields in the query received in step 302. In embodiments, datasets may be sorted according to a field(s) that is part of the keys on which a multi-dimensional aggregation is to be performed. Sorting may be performed on the dataset in its storage (e.g., storage 114), on an instance of the dataset in its storage, in memory of DB host 104, or in memory 206 of computing device 202, and/or the like.

In flow diagram 400, step 404 shows the dataset accessed in step 402 subsequent to sorting by partitioner 212. As noted above, the query received in step 302 may specify a multi-dimensional aggregation that includes the date and the country of sale as the keys. Accordingly, partitioner 212 has sorted the dataset according to the Date field, in chronological order, although other sorting strategies are also contemplated herein. Additionally, partitioner 212 may be configured to sort the dataset based on the Country field, and/or first by one field and then again by another field for each row of the first field. For example, as shown in step 404, for the rows of data with a given date identifier/value, the identifiers for the Country field may be sorted within each subset of dates.

In step 308 of flowchart 300, a table of a dataset is divided into a first plurality of partitions, each partition of the first plurality of partitions being the only partition to include a respective portion of the table, as first rows of data, having at least one subset of identifiers of a first field of the table having a same value. For instance, partitioner 212 may be configured to divide or shuffle a table of data of the dataset into partitions, as described herein. The division into partitions may be performed such that partitions are balanced, or approximately balanced, for the numbers of rows in the partitions to avoid skewing. The partitioned portions of the dataset are then provided to distributed servers or to separate logical processing partitions for processing.

Step 406 of flow diagram 400 illustrates the dividing of the table of the dataset into first partitions for step 308 of flowchart 300 in the context of distributed server group 106 of FIG. 1. As shown, two partition servers of distributed server group 106 are provided with the first partitions (partition server 106a as Node1, and a partition server 106b as Node2), although partitioner 212 may instead divide the dataset table into three partitions (e.g., a partition server 106c as Node3) with each date as shown being assigned to its own of the first partitions. It should also be noted that the partitioning may performed so that each subset of the Date field in each partition includes each instance of its associated identifiers/values.

For example, the first partition on Node1 is the only partition with rows of data having Date '1' and Date '3', just as the second partition on Node2 is the only one to include Date '2'. In the case of three partitions, as noted above for some embodiments, Node1 may be the only node of the first partitions with Date '1', and the third partition on Node3 may be the only node of the first partitions to include Date '3'. In other words, any allocation of rows or subsets of the dataset may be used for partitioning as long as a given identifier/value for the field on which the sort is performed, as in step 306, is only present in a single partition, and other numbers of partitions, more or fewer, may be used.

In step 310 of flowchart 300, a plurality of keys including each different combination of zero or more of the first field and at least a second field of the data is generated. In other words, keys are generated to include each different combination of zero or more of: two different fields—here, zero or more of: the first field along with at least a second field of the data. For instance, key manager 214 may be configured to generate keys for multi-dimensional aggregation operations based on the query received in step 302. In the illustrated example, the dates of sale and countries of sale serve as the basis for the generation of keys by key manager 214, e.g., by being so designated in the query. The generation of compound keys, e.g., keys with two or more portions or parts, is exemplarily described here for conceptualization and illustration of embodiments, and is not to be construed as limiting.

Continuing with the described example, it is noted above that the Date field and the Country of sale field are to be included as the keys for the multi-dimensional aggregation operation. Accordingly, a representation of the compound key for this multi-dimensional aggregation example may be [Date, Country] (or equivalently [Country, Date]). When specific identifiers/values for the Date field are to be considered in the multi-dimensional aggregation operation, the Date field specified in the compound key; likewise for specific identifiers/values of the Country field. For instance, when the compound key specifies [Date, Country] as the key combination, the specific identifiers/values of the fields are considered.

However, it should be noted that multi-dimensional aggregations may also include combinations over any or all identifiers/values for a field, rather than specific of identifiers/values, in combination with any or specific identifiers/values for one or more other fields. In such cases, a sentinel is used in place of the field designator for one or more portions of the compound key. A sentinel may be a pre-defined identifier that signifies all, or any, identifiers/values of a given field to aggregator 218 when performing multi-dimensional aggregations. Pre-defined identifiers for sentinels may be any value or structure supported by the database server software of DB(s) 116, storage 114, and/or DB host 104. As used for this example, the term "ALL" is used as a sentinel, while in other embodiments/implementations "NULL" or the like may be used instead.

In furtherance of the example described above using [Date, Country] for the compound key, combinations of the Date and Country fields may be used for performing multi-dimensional aggregations: [Date, Country], [Date,], [, Country], and [, ]. That is, there are four possible combination, including empty portions of the set. Illustrated in other ways, consider: [Date, Country], [Country], [Date], and [ ]; or [Date, Country], [ALL, Country], [Date, ALL], and [ALL, ALL], where the sentinel "ALL" represents combination where a field is not specifically designated (i.e., zero specific identifiers/values are to be considered when the sentinel is used—instead, all identifiers/values are to be considered). The key combination where each portion of the key is "ALL" represents the zero- or root-level aggregation. Here in this example, the [ALL, ALL] case represents the zero- or root-level aggregation because there are two fields specified for the key. In the case of three fields specified for the key, the zero- or root-level aggregation would be [ALL, ALL, ALL].

In this further example, there are four combinations because there are two fields specified for use as keys. In an example with three fields specified for use as keys, there are eight combinations. That is, the total combinations for a number F of fields used as keys is $2^F$, or two to the power of F.

In step 312 of flowchart 300, a respective blended portion of the table in each partition of the first plurality of partitions is generated, the respective blended portion of the table in each partition including instances of each of the first rows of data corresponding to each different combination of the plurality of keys. For example, input blender 216 may be configured to generate over partitions blended table portions of the data. The portion of the table of data shown in the first partitions, as illustrated in step 406 of flow diagram 400, is exploded and blended. That is, the portion of data in the first partitions is exploded to include rows of data that is blended with all the dimensions/combinations of the keys. Exploding may comprise duplication, copying, creation and/or the like, for each row of data in a partition. For example, an existing row of data such as the first row in step 406 of flow diagram 400 having Date '1' Country 'a' Units '10' (which corresponds to the key combination [Date, Country] or ("D+C")) may be duplicated for each other key combination. In another example, an entire new table may be created for each row of data over all combinations.

Turning again to flow diagram 400, step 408 illustrates for Node1 and Node2 the generated combinations of keys from step 310 as well as the corresponding rows of data over the partitions for the blended and exploded table of step 312. As shown for Node1, initially having a partition with four rows of data, using the four combinations of keys to blend the data yields sixteen rows for the exploded table (i.e., $2^F\times$initial rows=$2^2\times4$=16). For example, the first row of Date '1' Country 'a' Units '10' is exploded and blended into four rows:

(1) Date '1', Country 'a', Units '10', and Key 'D+C';
(2) Date '1', Country 'ALL', Units '10', and Key 'D';
(3) Date 'ALL', Country 'a', Units '10', and Key 'C';
(4) Date 'ALL", Country 'ALL', Units '10', and Key '-'.

Each row is similarly exploded and blended, yielding partitions of the full blended table. Likewise for Node3, there are three rows of data shown in step 406, so the exploded and blended table has twelve rows (i.e., $2^F\times$initial rows=$2^2\times$3=12). In another example with three keys and ten rows of data in the initial first partition, there would be 80 rows of data in the exploded and blended table (i.e., $2^F\times$initial rows=$2^3\times10$=80). It should be noted that in step 408 the rows for zero or empty combinations of keys (shown as '-') are grouped together at the bottom of Node1 for illustrative purposes only.

It is contemplated herein that for some embodiments, input blending and the first partial aggregation may be performed prior to, or as part of, the partitioning such that portions of the fully exploded table is provided and represented in a reduced or compact, and partially aggregated form to each partition.

In step 314 of flowchart 300, a characteristic of a third field is determined for each respective blended portion based on respective ones of said each different combination of the plurality of keys to generate a plurality of characteristics of the third field corresponding to each respective blended portion. For example, aggregator 218 may be configured to partially aggregate the number of units sold in the Units field for each key combination in each of the first partitions of the exploded and blended table. This partial aggregation may provide the number of units sold in the dataset, in this example, for the different combinations of specific keys required in the multi-dimensional aggregation as specified by the query. That is, in step 314, aggregator 218 is configured to determine a characteristic (e.g., units sold in this example) for the designated field (e.g., Units) in each portion of the blended table for each key combination that specifies each of the fields used for the keys, here as [Date, Country].

However, the key combination [,] is not yet determined, and other key combinations such as [Date,] and [, Country] may also need an additional, partial aggregation as will now be described for step 410 of flow diagram 400 and in continuation of step 314 of flowchart 300. For example, step 410 shows the additional, partial aggregation performed by aggregator 218 in which multiple instances of the key combinations [Date,] and [, Country] are aggregated for each partition. Here, the rows from step 408 shuffled for Node1 having Date '1' and Country 'ALL' with respective Units of '10' and '7' are combined into a single row in step 410 as Date '1', Country 'ALL', Units '17'. Similarly, the rows from step 408 shuffled for Node2 having Date '3' and Country 'ALL' with respective Units of 3 and '2' are combined into a single row in step 410 as Date '3', Country 'ALL', Units 5. The same additional, partial aggregation is performed for Node2 for Date '2', Country 'ALL'. While not shown explicitly for specific identifiers/values of the Country field in the partitions of step 410, e.g., because in this case there are only single rows for each identifier/value of Country, each row for a specific identifiers/values of the Country field with Date 'ALL' would also be partially aggregated by aggregator 218 in step 410.

Accordingly, an initial, per-partition plurality of characteristics, e.g., units sold, for key combinations is determined as described for step 314 via step 408 and step 410. Because the initial dataset in this example was sorted by the Date field and each identifier/value for the Date field was only present on a single partition, the units sold for each [Date, Country] and [Date,] key combination is thus far determined. The [,] (i.e., ["ALL", "ALL"]) and [, Country] key combinations, however, may be, and are in this example, still present on different partitions (Node1 and Node2). It should also be noted that the values being aggregated as flow diagram 400 progresses for the [,] key combination provide for reduced, or collapsed, numbers of rows of data having the [,] key combination in each partition. For example, in step 410, each row with "ALL" "ALL" for the Date and Country fields in step 408 for Node1 and Node1 has been reduced (or collapsed or partially aggregated) to a single row in each partition having a number of units sold equal to all rows, combined, for the [,] key combination.

In step 316 of flowchart 300, the plurality of characteristics is divided into a second plurality of partitions, each partition of the second plurality of partitions being the only partition to include a respective portion of the plurality of characteristics, as second rows of data, having one of the plurality of keys. For example, input blender 216 may be configured to generate a second plurality of partitions based on the initial, partial aggregated dataset shown in step 410 of flow diagram 400 as similarly described above for step 308 of flowchart 300. For step 316, every row of data with a [,] and [, Country] key combination will be included in only one of the second partitions.

Referring now to flow diagram 500, the second partitions from step 316 of flowchart 300 are shown. Partitioning for flow diagram 500 may be performed by input blender 216 according to step 502a or step 502b, each of which may follow step 410 of flow diagram 400. Step 502a shows two partitions for Node1 (partition server 106a) and Node2 (partition server 106b), while step 502b shows three partitions for Node1 (partition server 106a), Node2 (partition server 106b), and Node3 (partition server 106c). In embodiments, any number of partitions are contemplated herein for step 316 of flowchart 300 and flow diagram 500, e.g., to avoid skewing and/or achieve balanced partitions, with the possible constraints of (1) having each row with a given key combination in the same partition, and/or (2) having the [,] key combination in its own partition. For example, both of step 502a and step 502b show the rows for the combination of Date 'ALL' Country 'ALL' as being the only rows included for Node2.

Also notable, as mentioned above, is that there are only two rows for the [,] key combination in Node2. These two rows correspond to the single rows for the [,] key combination in each partition of step 410 in flow diagram 400. This reduction in rows through intermediate aggregation of this key combination reduces the memory footprint for the Node2 partition, and also reduces the processing complexity in the final aggregation portion.

In step 318 of flowchart 300, a final characteristic of the third field is determined for each of the second rows of data in each of the second plurality of partitions as the multi-dimensional aggregation. For example, aggregator 218 may be configured to determine the final characteristic of the third field for the rows of data in the second plurality of partitions. Continuing with the example above, aggregator 218 may determine the final characteristic for units sold over each the different combinations of keys for the dataset.

Step 504 of flow diagram 500 shows the final characteristic for units sold determined by aggregator 218 based on step 408 and step 410 of flow diagram 400 and on step 502a or 502b of flow diagram 500. Step 504 shows the total units for each date, the total units for each country, the total units for each date in each country, and the total overall units sold. In other words, each unique combination of keys, for each identifier/value thereof, has a determined number of units shown in step 504 as the multi-dimensional aggregation.

In other words, as shown above, results for multi-dimensional aggregation operations are generated without performing multiple, separate aggregations over a dataset for different keys and combining the separate results, as in prior solutions, which lead to skewing and memory/resource shortages. The embodiments herein provide for obtaining a root-level results for multi-dimensional aggregation operations via input blending and distributed partitioning that prevents bottlenecks/blocking at the root level for determining the results. That is, prior solutions do not allow for partitioning at the root level over large datasets. In other words, the described embodiments partition, or shuffle, a dataset and explode or expand the input data therefor using blending to perform a multi-dimensional aggregation operation without aggregating the dataset multiple times for each key (i.e., for each dimension). In contrast to conventional approaches, the described embodiments balance memory usage, and efficiently use memory in a way so that multi-dimensional aggregation can actually be performed across entire datasets, such as big data stores with billions or hundreds of billions of entries, using existing memory resources.

Figure 6:
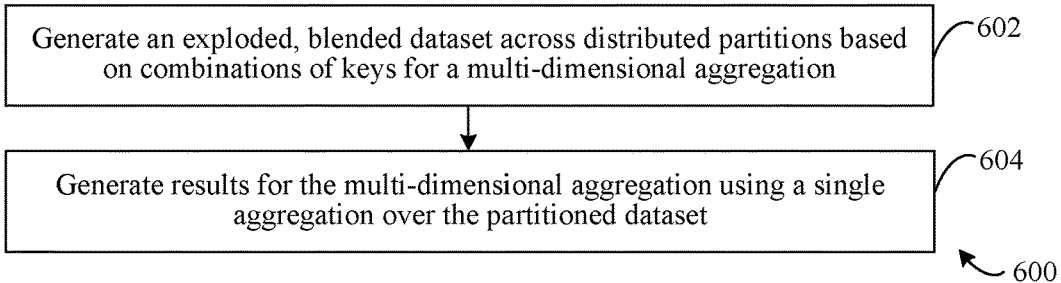
FIG. 6 shows a flowchart for scalable implementations of multi-dimensional aggregations in distributed query processing systems, according to an example embodiment.

For example, FIG. 6 shows a flowchart 600 for scalable implementations of multi-dimensional aggregations with input blending in distributed query processing systems, according to example embodiments. DB manager 208 may operate according to flowchart 600, in embodiments. Further structural and operational examples will be apparent to persons skilled in the relevant art(s) based on the following description. Flowchart 600 is described as follows with respect to system 100 of FIG. 1 and system 200 of FIG. 2.

Flowchart 600 begins at step 602. In step 602, an exploded, blended dataset is generated across distributed partitions based on combinations of keys for a multi-dimensional aggregation. For instance, DB manager 208 in system 200 may be configured to generate an exploded, blended dataset across distributed partitions based on combinations of keys associated with the different dimensions of the aggregation operation. The keys and specific multi-dimensional aggregation may be specified in a received query. DB manager 208 may access the dataset in a storage thereof, either directly or via a network, as shown in FIG. 1, according to embodiments. Once accessed, the dataset may be processed, retrieved, and/or distributed.

In step 604, results for the multi-dimensional aggregation are generated using a single aggregation over the partitioned dataset. For instance, DB manager 208 may be configured to generate the results for the multi-dimensional aggregation. The results may be generated by DB manager 208 by aggregating over the partitioned dataset, that has been exploded and blended according to key combinations, only a single time, and without performing a union of multiple, separate aggregation operations.

Accordingly, operations required are reduced in number and complexity, thus reducing the requirements for system resources such as processing cycles and memory utilization, including memory allocation across distributed servers. The multi-dimensional aggregation embodiments described also eliminate the need for specific support required by prior solutions for operations such as grouping sets, rollup, and cubes.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, such as system 100 of FIG. 1 and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a computing device in stationary or mobile computer embodiments, including one or more features of mobile systems and/or computing devices described herein, as well as alternative features. The descriptions of computing devices/systems provided herein are provided for purposes of illustration, and are not intended to be limiting. Embodiments may be implemented in further types of computer systems, as would be known to persons skilled in the relevant art(s).

Figure 7:
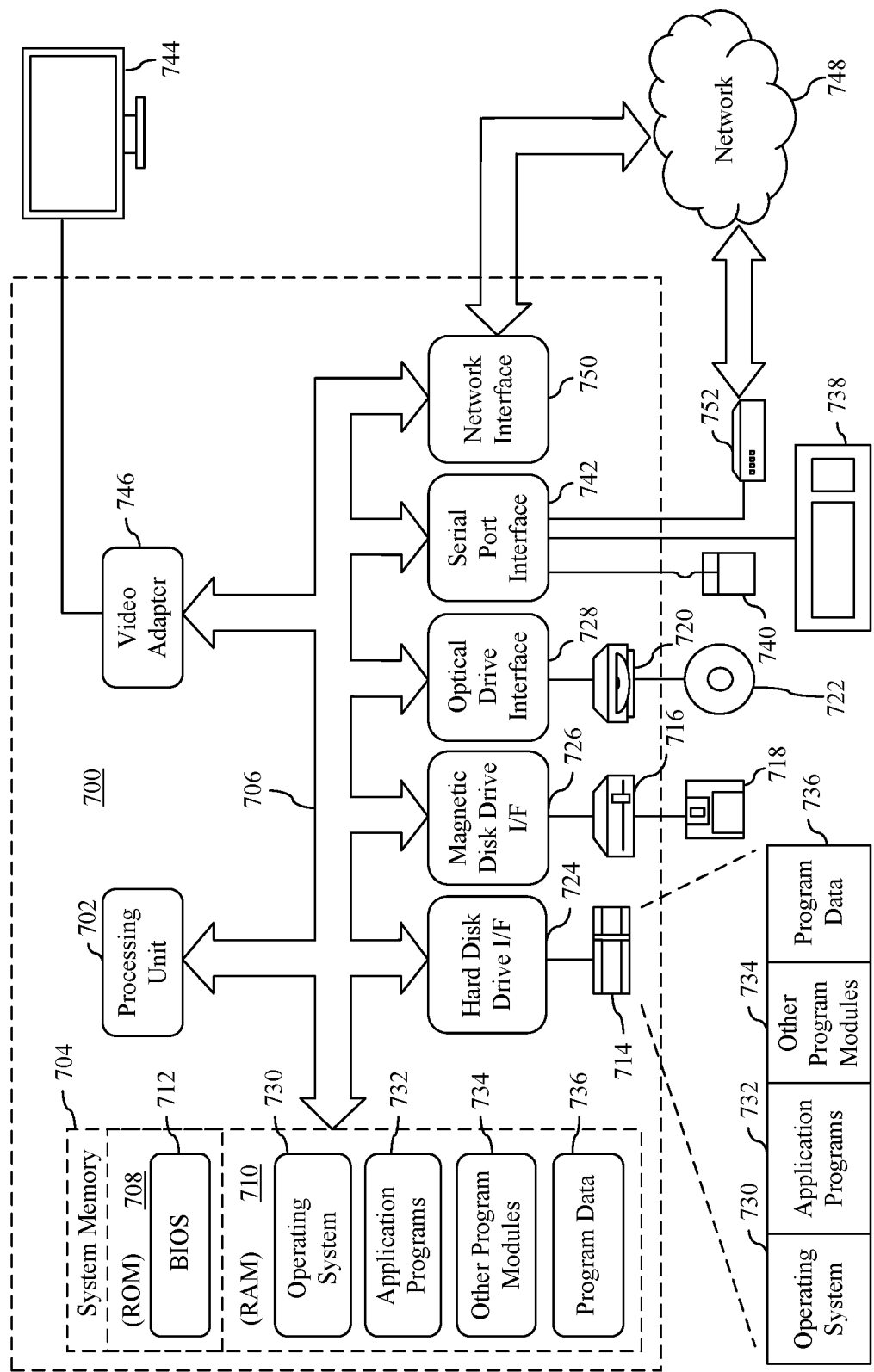
FIG. 7 shows a block diagram of an example computing device that may be used to implement embodiments.

FIG. 7 depicts an exemplary implementation of a computing device 700 in which embodiments may be implemented. For example, embodiments described herein may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems and/or game consoles, etc., as would be known to persons skilled in the relevant art(s).

As shown in FIG. 7, computing device 700 includes one or more processors, referred to as processor circuit 702 (also "processing unit" herein), a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing embodiments described herein, such as system 100 of FIG. 1 and system 200 of FIG. 2, as well as the flowcharts/flow diagrams described herein, including portions thereof, and/or further examples described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including memory 720 of FIG. 7). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

Embodiments herein also contemplate cases in which the identifier/value used as a sentinel, i.e., the sentinel designator, is also an identifier/value for data of a field. In such cases, the sentinel designator may also be used similarly as a key component/portion for determining characteristics to ensure that all values are aggregated and that the sentinel designator does not hide or otherwise interfere with operations.

The described embodiments for scalable implementations of multi-dimensional aggregations with input blending in distributed query processing systems are applicable beyond the example embodiments described above. For example, while embodiments in the Sections above may be described in the context of queries run against a database for multi-dimensional aggregations, the embodiments herein are not so limited and may also be applied for other types of requests, jobs, functions, and/or processes that may be run to determine combinations for any field of any store of data against any number of key combinations.

Furthermore, the described embodiments do not exist in software solutions for enhancements and improvements for scalable implementations of multi-dimensional aggregations with input blending in distributed query processing systems. Conventional solutions lack the ability to scale for very large datasets such as big data stores, cannot distribute root-level aggregations over partitions, do not balance memory and processing allocation, require special support in servers, require additional operations, and which leads to increased processing cycles being required, insufficient memory being available to fully perform aggregations, and bottlenecks/blocking for root-level operations. That is, conventional solutions do not allow for efficient multi-dimensional aggregations through exploding and the blending of input data performed over distributed partitions in a single aggregation operation. As an additional example of this, the embodiments herein eliminate the need for performing a union of the results for separate aggregation operation used in conventional solutions. Still further, the described embodiments provide for performing multi-dimensional aggregations using more efficient and systematically-balanced operations for big data stores that may include hundreds of billions or more entries of raw data.

The additional examples and embodiments described in this Section may be applicable to examples disclosed in any other Section or subsection of this disclosure.

A system is described herein. The system may be configured and enabled in various ways for distributed multi-dimensional aggregations via input blending based on multiple keys, as described herein according to the embodiments. The system includes a processing system with one or more processors and a memory that stores program code to be executed by the processing system.

The program code is configured to divide a table of a dataset into a first plurality of partitions, each partition of the first plurality of partitions being the only partition to include a respective portion of the table, as first rows of data, having at least one subset of identifiers of a first field of the table having a same value, and generate a plurality of keys including each different combination of zero or more of the first field and at least a second field of the data. The program code is also configured to generate in each partition of the first plurality of partitions a respective blended portion of the table, each respective blended portion including instances of each of the first rows of data corresponding to each different combination of the plurality of keys, and determine, for each respective blended portion, a characteristic of a third field based on respective ones of said each different combination of the plurality of keys to generate a plurality of characteristics of the third field corresponding to each respective blended portion. The program code is further configured to divide the plurality of characteristics into a second plurality of partitions, each partition of the second plurality of partitions being the only partition to include a respective portion of the plurality of characteristics, as second rows of data, having one of the plurality of keys, and determine, for each of the second rows of data in each of the second plurality of partitions, a final characteristic of the third field as the multi-dimensional aggregation.

In an embodiment of the system, to divide the plurality of characteristics into a second plurality of partitions, the program code is configured to generate one partition of the second plurality of partitions to include only ones of the second rows of data that include a key of the plurality of keys with a combination of zero of the first field and the at least a second field.

In an embodiment of the system, the program code is configured to generate a plurality of characteristics and determine for each of the second rows of data as a single aggregation over the dataset.

In an embodiment of the system, at least one of the first plurality of partitions or the second plurality of partitions are maintained in at least one of a plurality of distributed servers or a plurality of logically separate computing environments, and the program code is configured to perform one or more operations at one or more of the plurality of distributed servers or the plurality of logically separate computing environments.

In an embodiment of the system, the final characteristic of the third field for each of the second rows of data in each of the second plurality of partitions subsumes a root-level aggregation of the dataset for the plurality of keys.

In an embodiment of the system, the dataset comprises log entries having data for at least one of a hosted web service or a hosted web application. In an embodiment of the system, the system is a cloud-based system that hosts big data storage for the dataset.

In an embodiment of the system, the program code is configured to receive a request for determining the multi-dimensional aggregation, access the dataset to determine the multi-dimensional aggregation subsequent to receiving the request, and provide the final characteristic of the third field respectively from each of the second plurality of partitions as a response to the request.

A computer-implemented method is also described herein. In embodiments, the computer-implemented method is for distributed multi-dimensional aggregations via input blending based on multiple keys, as described herein according to the embodiments. The computer-implemented method may be implemented by a database host and/or distributed servers.

The computer-implemented method includes dividing a table of a dataset into first partitions, each row of data of the dataset that has an identifier of a first field of the table with a same value being in a same partition of the first partitions, and generating in each partition of the first partitions a respective blended portion of the table, each respective blended portion including instances of the first rows of data corresponding to each different combination of a plurality of keys that comprise each different combination of zero or more of the first field and at least a second field of the data. The method also includes determining, for each respective blended portion, a characteristic of a third field for every combination of the plurality of keys to generate a plurality of characteristics of the third field, dividing the plurality of characteristics into second partitions, each row of the plurality of characteristics that has a same one of the plurality of keys being only on one of the second partitions, and determining, for each row of the plurality of characteristics in each of the second partitions, a final characteristic of the third field as the multi-dimensional aggregation.

In an embodiment of the computer-implemented method, dividing the plurality of characteristics into second partitions includes generating one partition of the second partitions to include only rows of the plurality of characteristics that have a key of the plurality of keys with a combination of zero of the first field and the at least a second field.

In an embodiment of the computer-implemented method, generating the plurality of characteristics and said determining a final characteristic includes a single aggregation over the dataset that subsumes a root-level aggregation.

In an embodiment of the computer-implemented method, at least one of the first partitions or the second partitions are maintained in at least one of a plurality of distributed servers or a plurality of logically separate computing environments.

In an embodiment of the computer-implemented method, the characteristic and the final characteristic a total number of values for the third field with respect to the plurality of keys.

In an embodiment of the computer-implemented method, the dataset comprises log entries having data for at least one of a hosted web service or a hosted web application In an embodiment of the computer-implemented method, the computer-implemented is implemented at a cloud-based system that hosts big data storage for the dataset.

In an embodiment, the computer-implemented method further includes receiving a request for determining the multi-dimensional aggregation, accessing the dataset to determine the multi-dimensional aggregation subsequent to receiving the request, and providing the final characteristic of the third field respectively from each of the second partitions as a response to the request.

A computer-readable storage medium having program instructions recorded thereon that, when executed by one or more processors, perform a method for distributed multi-dimensional aggregations via input blending based on multiple keys is also described herein according to embodiments.

The method includes dividing a table of a dataset into first distributed partitions, each row of data of the table of the dataset that has an identifier of a first field of the dataset with a same value being in a same partition of the first distributed partitions, and generating in each partition of the first distributed partitions a respective blended portion of the table, each respective blended portion including instances of the first rows of data corresponding to each different combination of a plurality of keys that comprise each different combination of zero or more of the first field and at least a second field of the data. The method also includes determining, for each respective blended portion, a characteristic of a third field for every combination of the plurality of keys to generate a plurality of characteristics of the third field, dividing the plurality of characteristics into second distributed partitions, each row of the plurality of characteristics that has a same one of the plurality of keys being only on one of the second distributed partitions, and determining, for each row of the plurality of characteristics in each of the second distributed partitions, a final characteristic of the third field as the multi-dimensional aggregation.

In an embodiment for the computer-readable storage medium, dividing the plurality of characteristics into second distributed partitions for the method includes generating one partition of the second distributed partitions to include only rows of the plurality of characteristics that have a key of the plurality of keys with a combination of zero of the first field and the at least a second field.

In an embodiment for the computer-readable storage medium, generating the plurality of characteristics and determining a final characteristic for the method include a single aggregation over the dataset that subsumes a root-level aggregation.

In an embodiment for the computer-readable storage medium, at least one of the first distributed partitions or the second distributed partitions are maintained in a plurality of distributed servers.

In an embodiment for the computer-readable storage medium, the characteristic and the final characteristic include a total number of values for the third field with respect to the plurality of keys.

In an embodiment for the computer-readable storage medium, the dataset comprises log entries having data for at least one of a hosted web service or a hosted web application. In an embodiment for the computer-readable storage medium, the one or more processors are part of a cloud-based system that hosts big data storage for the dataset.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for determining a multi-dimensional aggregation, the system comprising:
   a processing system that includes one or more processors; and
   a memory configured to store program code to be executed by the processing system, the program code configured to:
      divide a table of a dataset into a first plurality of partitions across a first plurality of distributed servers of the system, respectively, each partition of the first plurality of partitions being the only partition to include a respective portion of the table, as first rows of data, having at least one subset of identifiers of a first field of the table having a same value;
      generate a plurality of keys including each different combination of zero or more of the first field and at least a second field of the data;
      generate in each partition of the first plurality of partitions a respective blended portion of the table, each respective blended portion including instances of each of the first rows of data corresponding to each different combination of the plurality of keys;
      determine, for each respective blended portion, a characteristic of a third field based on respective ones of said each different combination of the plurality of keys to generate a plurality of characteristics of the third field corresponding to each respective blended portion;
      divide the plurality of characteristics into a second plurality of partitions across a second plurality of distributed servers of the system, respectively, each partition of the second plurality of partitions being the only partition to include a respective portion of the plurality of characteristics, as second rows of data, having one of the plurality of keys; and
      determine, for each of the second rows of data in each of the second plurality of partitions, a final characteristic of the third field as the multi-dimensional aggregation that distributively subsumes a root-level aggregation of the dataset for the plurality of keys.

2. The system of claim 1, wherein to divide the plurality of characteristics into a second plurality of partitions, the program code is configured to:
   generate one partition of the second plurality of partitions to include only ones of the second rows of data that include a key of the plurality of keys with a combination of zero of the first field and the at least a second field.

3. The system of claim 1, wherein said generate a plurality of characteristics and said determine for each of the second rows of data comprise a single aggregation over the dataset.

4. The system of claim 1, wherein at least one of the first plurality of partitions or the second plurality of partitions are maintained in at least one of a plurality of distributed servers or a plurality of logically separate computing environments; and
   wherein the program code is configured to perform one or more operations at one or more of the plurality of distributed servers or the plurality of logically separate computing environments.

5. The system of claim 1, wherein the second plurality of distributed servers includes a different number of second plurality of distributed servers than the first plurality of distributed servers.

6. The system of claim 1, wherein the dataset comprises log entries having data for at least one of a hosted web service or a hosted web application; or
   wherein the system is a cloud-based system that hosts big data storage for the dataset.

7. The system of claim 1, wherein the program code is configured to:
   receive a request for determining the multi-dimensional aggregation;
   access the dataset to determine the multi-dimensional aggregation subsequent to receiving the request; and
   provide the final characteristic of the third field respectively from each of the second plurality of partitions as a response to the request.

8. A computer-implemented method for determining a multi-dimensional aggregation, the method comprising:
   dividing a table of a dataset into first partitions across a first plurality of distributed servers of the system, respectively, each row of data of the dataset that has an identifier of a first field of the table with a same value being in a same partition of the first partitions;
   generating in each partition of the first partitions a respective blended portion of the table, each respective blended portion including instances of the first rows of data corresponding to each different combination of a plurality of keys that comprise each different combination of zero or more of the first field and at least a second field of the data;
   determining, for each respective blended portion, a characteristic of a third field for every combination of the plurality of keys to generate a plurality of characteristics of the third field;
   dividing the plurality of characteristics into second partitions across a second plurality of distributed servers of the system, respectively, each row of the plurality of characteristics that has a same one of the plurality of keys being only on one of the second partitions; and
   determining, for each row of the plurality of characteristics in each of the second partitions, a final characteristic of the third field as the multi-dimensional aggregation that distributively subsumes a root-level aggregation of the dataset for the plurality of keys.

9. The computer-implemented method of claim 8, wherein dividing the plurality of characteristics into second partitions comprises:
   generating one partition of the second partitions to include only rows of the plurality of characteristics that have a key of the plurality of keys with a combination of zero of the first field and the at least a second field.

10. The computer-implemented method of claim 8, wherein the second plurality of distributed servers includes a different number of second plurality of distributed servers than the first plurality of distributed servers.

11. The computer-implemented method of claim 8, wherein at least one of the first partitions or the second partitions are maintained in at least one of a plurality of distributed servers or a plurality of logically separate computing environments.

12. The computer-implemented method of claim 8, wherein the characteristic and the final characteristic a total number of values for the third field with respect to the plurality of keys.

13. The computer-implemented method of claim 8, wherein the dataset comprises log entries having data for at least one of a hosted web service or a hosted web application; or
wherein the computer-implemented is implemented at a cloud-based system that hosts big data storage for the dataset.

14. The computer-implemented method of claim 8, further comprising:
receiving a request for determining the multi-dimensional aggregation;
accessing the dataset to determine the multi-dimensional aggregation subsequent to receiving the request; and
providing the final characteristic of the third field respectively from each of the second partitions as a response to the request.

15. A computer-readable storage medium having program instructions recorded thereon that, when executed by one or more processors, perform a method for determining a multi-dimensional aggregation, the method comprising:
dividing a table of a dataset into first distributed partitions across a first plurality of distributed servers of the system, respectively, each row of data of the table of the dataset that has an identifier of a first field of the dataset with a same value being in a same partition of the first distributed partitions;
generating in each partition of the first distributed partitions a respective blended portion of the table, each respective blended portion including instances of the first rows of data corresponding to each different combination of a plurality of keys that comprise each different combination of zero or more of the first field and at least a second field of the data;
determining, for each respective blended portion, a characteristic of a third field for every combination of the plurality of keys to generate a plurality of characteristics of the third field;
dividing the plurality of characteristics into second distributed partitions across a second plurality of distributed servers of the system, respectively, each row of the plurality of characteristics that has a same one of the plurality of keys being only on one of the second distributed partitions; and
determining, for each row of the plurality of characteristics in each of the second distributed partitions, a final characteristic of the third field as the multi-dimensional aggregation that distributively subsumes a root-level aggregation of the dataset for the plurality of keys.

16. The computer-readable storage medium of claim 15, wherein dividing the plurality of characteristics into second distributed partitions comprises:
generating one partition of the second distributed partitions to include only rows of the plurality of characteristics that have a key of the plurality of keys with a combination of zero of the first field and the at least a second field.

17. The computer-readable storage medium of claim 15, wherein the second plurality of distributed servers includes a different number of second plurality of distributed servers than the first plurality of distributed servers.

18. The computer-readable storage medium of claim 15, wherein at least one of the first distributed partitions or the second distributed partitions are maintained in a plurality of distributed servers.

19. The computer-readable storage medium of claim 15, wherein the characteristic and the final characteristic include a total number of values for the third field with respect to the plurality of keys.

20. The computer-readable storage medium of claim 15, wherein the dataset comprises log entries having data for at least one of a hosted web service or a hosted web application; or
wherein the one or more processors are part of a cloud-based system that hosts big data storage for the dataset.

\* \* \* \* \*